United States Patent
Weber et al.

(10) Patent No.: US 6,607,174 B2
(45) Date of Patent: Aug. 19, 2003

(54) DISPENSING APPARATUS WITH IN-LINE ACTUATOR

(75) Inventors: Bruce Weber, Fenton, MO (US); Paul E. Naslund, St. Louis, MO (US)

(73) Assignee: Dema Engineering Company, St. Louis, MO (US)

( * ) Notice: Subject to any disclaimer, the term of this patent is extended or adjusted under 35 U.S.C. 154(b) by 0 days.

(21) Appl. No.: 09/981,596

(22) Filed: Oct. 17, 2001

(65) Prior Publication Data

US 2003/0071234 A1 Apr. 17, 2003

(51) Int. Cl.[7] ............................................. F16K 31/12
(52) U.S. Cl. ......................... 251/25; 251/30.03; 251/65
(58) Field of Search ....................... 251/25, 30.03, 251/65

(56) References Cited

U.S. PATENT DOCUMENTS

| | | | |
|---|---|---|---|
| 2,629,401 A | * | 2/1953 | Miller ..................... 251/30.03 |
| 4,181,242 A | | 1/1980 | Zygiel et al. |
| 4,274,444 A | * | 6/1981 | Ruyak ......................... 251/65 |
| 4,697,610 A | | 10/1987 | Bricker et al. |
| 4,807,783 A | | 2/1989 | van Zijverden |
| 5,009,388 A | * | 4/1991 | Pei-gi et al. ................... 251/65 |
| 5,129,619 A | * | 7/1992 | Castetter ....................... 251/65 |
| 5,159,958 A | | 11/1992 | Sand |
| 5,169,117 A | * | 12/1992 | Huang ..................... 251/30.03 |
| 5,228,598 A | | 7/1993 | Bally et al. |
| 5,253,677 A | | 10/1993 | Sand |
| 5,518,020 A | | 5/1996 | Nowicki et al. |
| 5,597,019 A | | 1/1997 | Thomas et al. |
| 5,651,398 A | | 7/1997 | Decker et al. |
| 5,758,863 A | * | 6/1998 | Buffet et al. ................... 251/65 |
| 5,832,972 A | | 11/1998 | Thomas et al. |
| 6,105,633 A | | 8/2000 | Pedersen et al. |
| 6,363,977 B1 | | 4/2002 | Smeller et al. |
| 2002/0040737 A1 | | 4/2002 | Beldham et al. |

* cited by examiner

Primary Examiner—Ehud Gartenberg
Assistant Examiner—John Bastianelli
(74) Attorney, Agent, or Firm—Polster, Lieder, Woodruff & Lucchesi, L.C.

(57) ABSTRACT

This dispensing apparatus includes a shut-off valve having a magnetically actuated valve element. The valve element is moved into an open position by magnetic attraction from a magnet mounted to a movable actuator. The actuator is adapted to be raised by a liftable handle connected to the actuator or by application of an upward force applied by a bottle container to the actuator. In both cases, the valve element is moved vertically by the application of a vertical force to the actuator.

9 Claims, 7 Drawing Sheets

DISPENSING APPARATUS WITH IN-LINE ACTUATOR

BACKGROUND OF THE INVENTION

This invention relates generally to a liquid dispensing apparatus and particularly to a non-electric dispenser including a magnetically actuated water valve having an actuator which may be operated by a handle or by engagement with a container.

Dispensers of the type which are commonly used for filling containers such as bottles and pails with diluted cleaner concentrate are well known in the prior art. They are commonly used in cleaning operations in commercial establishments such as hospitals, hotels and restaurants and include a shut-off valve assembly mounted in a housing, which may be wall-mounted or portable. Typically, the shut-off valve receives and controls water flow from a faucet by means of a push button control. The valve may be connected to a proportioner to which the water from the valve is directed and which also receives cleaner concentrate from a source such as a concentrate container. A flexible or rigid tube directs the diluted concentrate into smaller containers such as bottles. The operation is simple in most cases and it is merely a matter of the operator holding the bottle with one hand, inserting the outlet hose into the bottle and depressing the push button with the other hand.

It is sometimes advantageous to provide a single-handed operation such as is found in domestic refrigerators in which an external push flap is used to control the flow of water into a cup held by the user. In the commercial field, bottle-operated dispensers are known such as that disclosed in U.S. Pat. Nos. 5,832,972 and 6,105,633 which are incorporated herein by reference. In these dispensers, a bottle may be pushed upwardly against a mechanism which directly operates a push button to actuate a shut-off valve. However, the nature of the mechanism, which depends on friction imparted to the push button by an inclined plate, is such that the dispenser cannot be operated in its normal push button mode due to obstruction from the inclined plate.

Other dispensers are known which utilize a mechanical linkage to operate the push button, for example, commonly owned copending U.S. patent application Ser. Number 686,260. This dispenser operates effectively and avoids the use of an inclined plate blocking the push button but use of a mechanical linkage results in additional cost which the present invention avoids.

This dispenser solves the above noted and other problems in a manner not disclosed in the known prior art.

SUMMARY OF THE INVENTION

This dispensing apparatus is particularly suitable for filling containers with diluted cleaner concentrate. It provides for actuation of a liquid valve by magnetic attraction of a valve element into an open position by use of a liftable frame which can be actuated by a simple handle or by applying an upward force to the frame from a hand-held container. The direction of movement of the valve element is in-line with, rather than transverse to the movement of the frame.

This dispensing apparatus comprises a shut-off valve having an inlet receiving liquid from a liquid source and an outlet directing said liquid to a dispensing source. A valve seat is disposed between the inlet and the outlet and defines a flow axis through the valve seat and a valve element movable from a closed position restricting flow through the valve seat to an open position permitting flow through the valve seat. An actuator means moves the valve element between the closed position to the open position by magnetic attraction, the actuator means moving said valve element in the same direction as said actuator means.

It is an aspect of this invention to provide that the actuator means includes a movable magnetic element, the valve element constitutes a main operator, which may be a diaphragm and a plunger, said plunger being movable by the magnetic element to move the valve element to the open position.

It is another aspect of this invention to provide that the actuator means includes a movable frame having a first portion carrying a magnetic element disposed about said plunger movable with said frame and a second portion connected to said first portion and having means for moving said first portion and said magnetic element.

It is yet another aspect of this invention to provide that said first portion includes a handle and still another aspect to provide that said second portion includes a container engageable portion.

This invention provides an in-line dispenser which is simple and inexpensive to manufacture, easy to assemble and is highly efficient for its intended purpose.

DESCRIPTION OF THE PREFERRED EMBODIMENT

Figure 1:
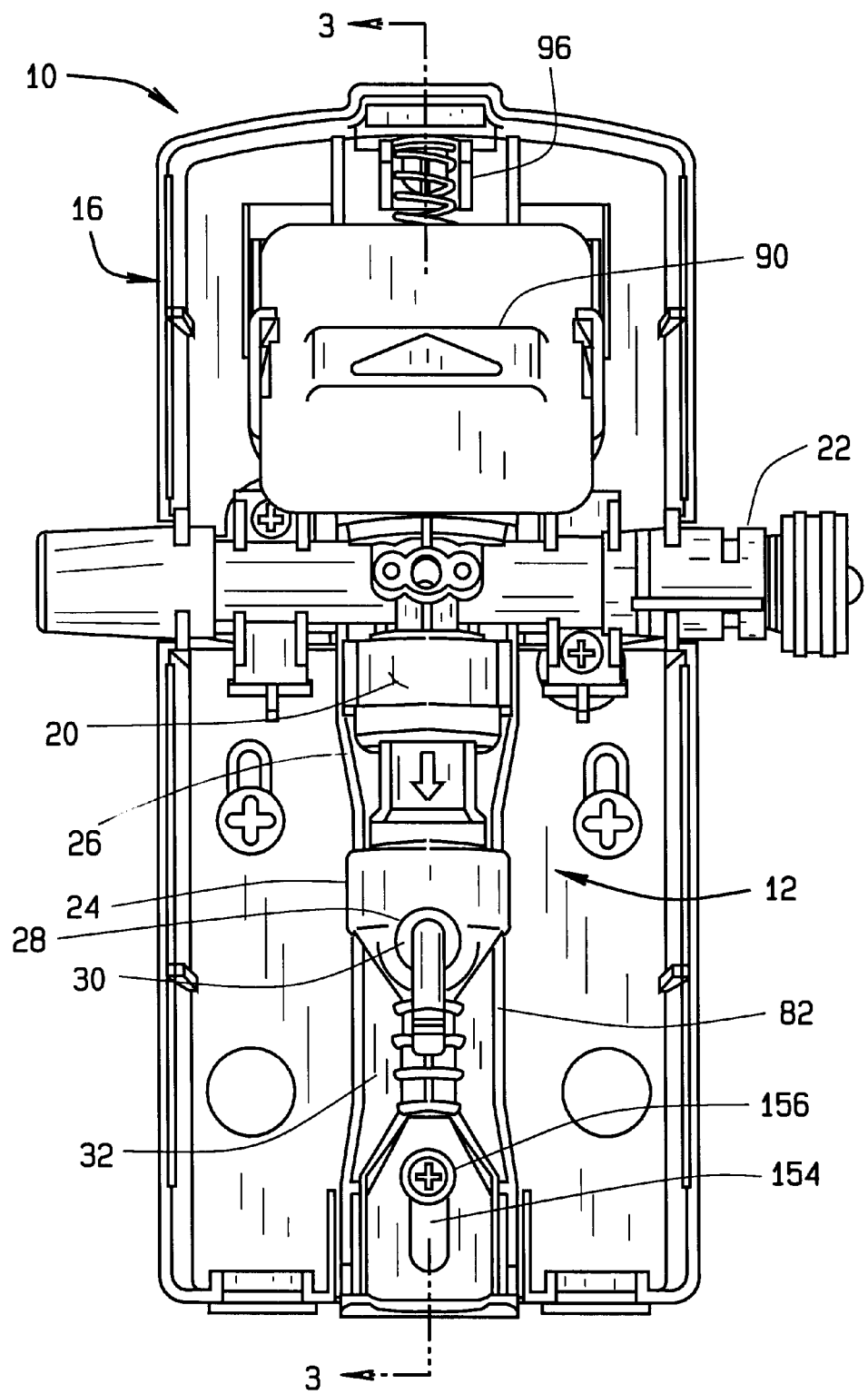
FIG. 1 is a front elevational view of the dispenser without the cover.
Figure 2:
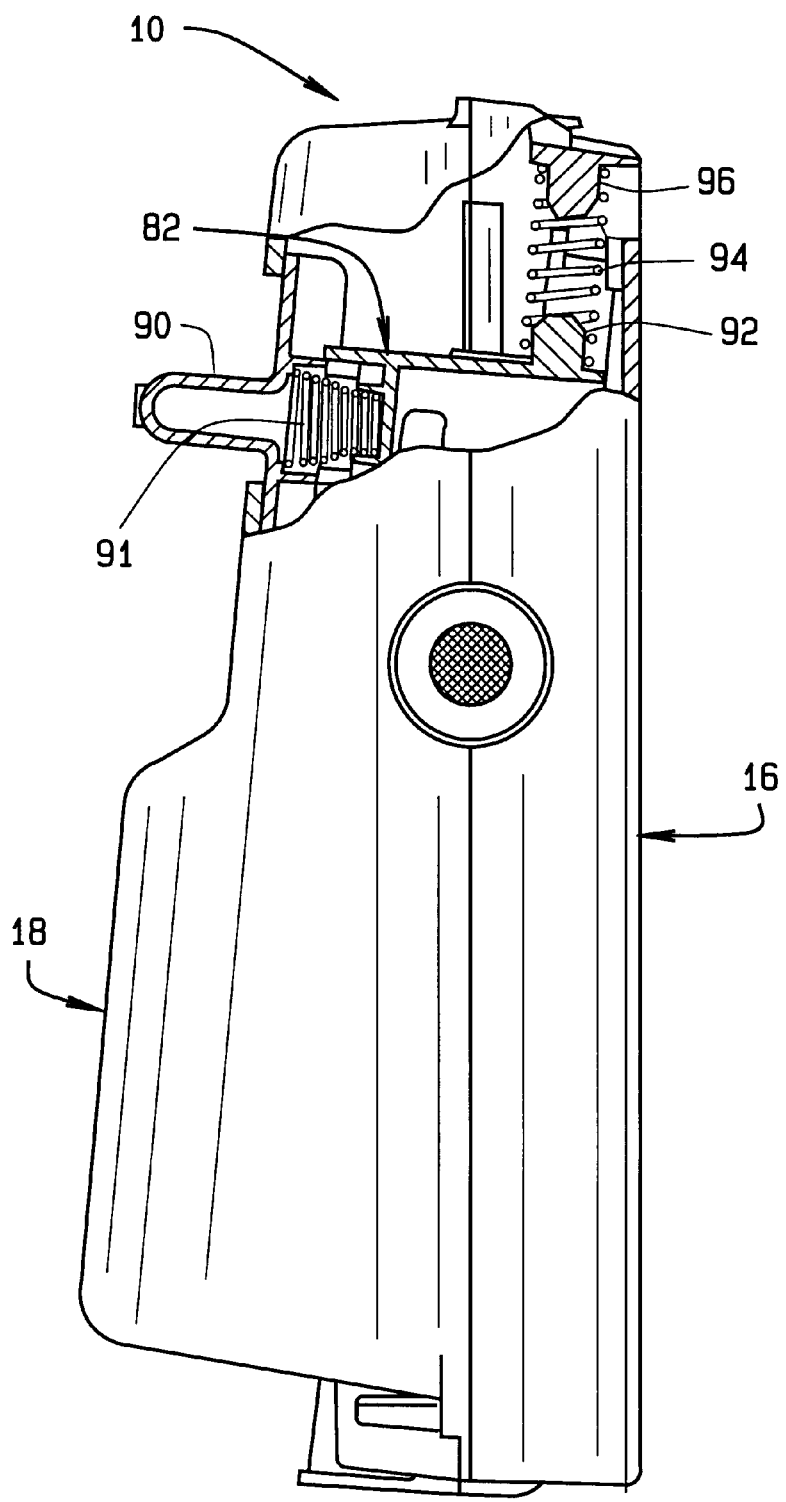
FIG. 2 is an side view of the dispenser.

Referring now by reference numerals to the drawings and first to FIGS. 1 and 2, it will be understood that the dispensing apparatus 10 includes a dispenser 12 having a base 16, which may be mounted to a wall, and a cover 18.

The base 16 and the cover 18 constitute a housing and mounted to the base 16 is a shut-off valve assembly 20 supplying liquid, for example water, by way of a supply line 22 to a dispensing device generally indicated by numeral 12. In the embodiment shown, the dispensing device 12 may include a back flow preventer 26 and a proportioner 24 of the type disclosed in copending U.S. patent application Ser. No. 09/921,399 which is commonly owned by the assignee of the present invention and is incorporated herein by reference. The proportioner 24 may include a venturi 28 which draws a second liquid, such as detergent, into the venturi 28 through an inlet 30 for mixing and discharge through an outlet 32. The proportioner 24 and backflow preventer 26 are not part of the invention and the dispenser may be used with other devices. To this end, the valve 20 may be considered as a means for dispensing liquid through the valve outlet 48 directly to a hose 33 or indirectly to a backflow preventer 26 and a proportioner 24 for dispensing a liquid mixture through said outlet 32 to said hose 33.

Essentially, the shut-off valve 20 includes a dual or single actuating system and may be operated by a handle 90 connected to a frame 82 or by a container such as a bottle 100 which engages said frame 82, as will now be discussed.

Figure 3:
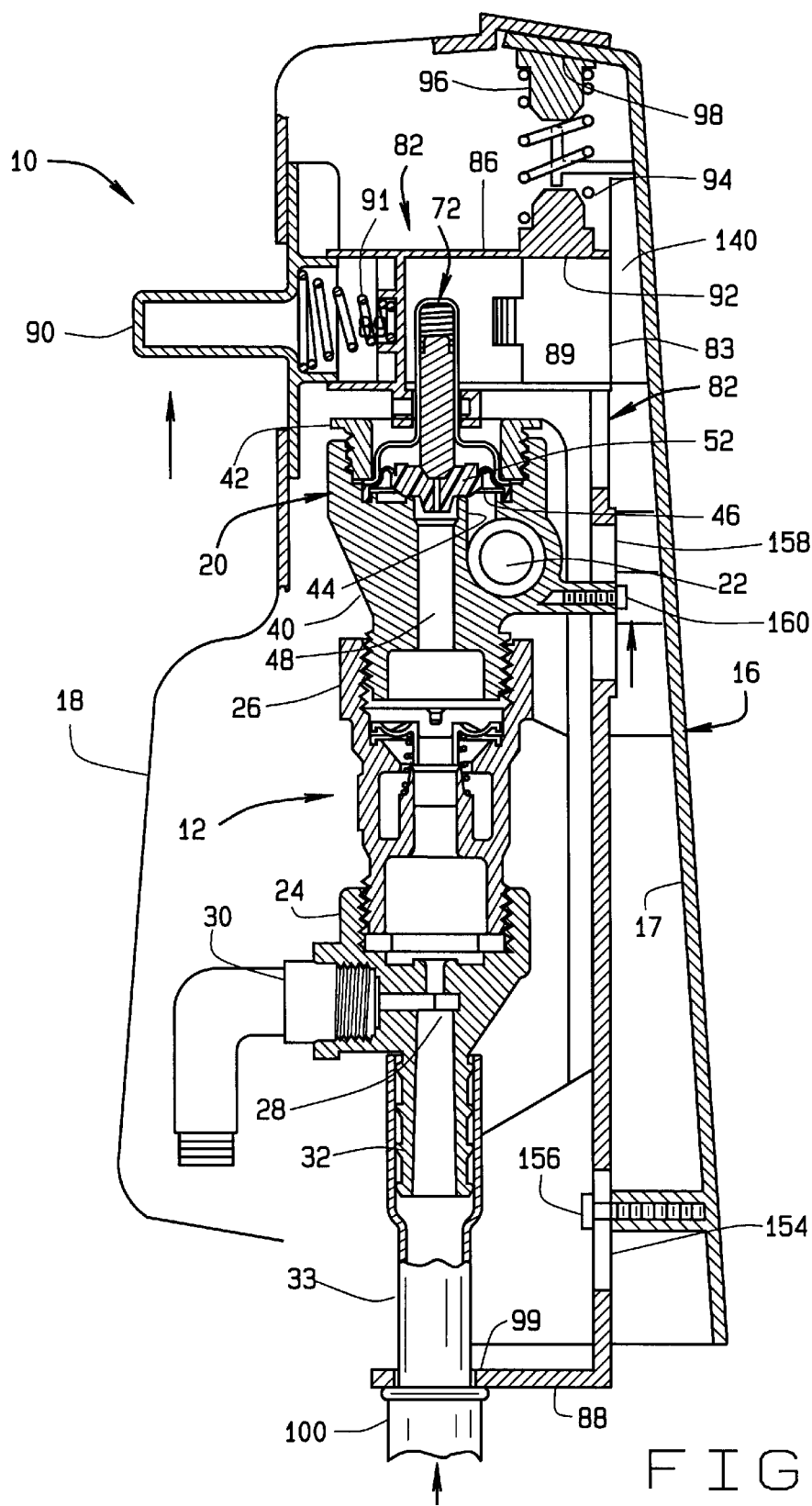
FIG. 3 is a fragmentary cross-sectional view taken on Line 3—3 of FIG. 1.
Figure 4:
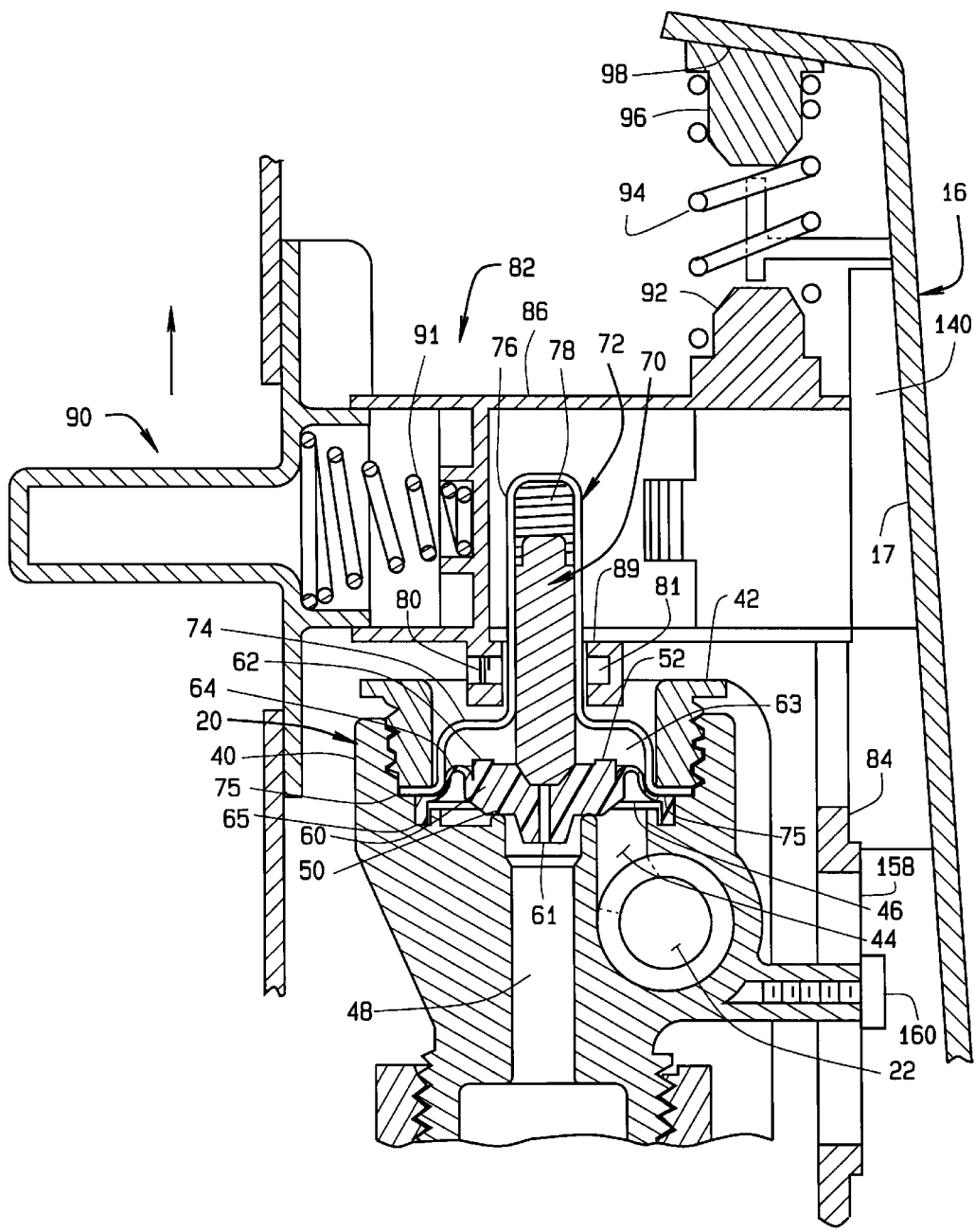
FIG. 4 is an enlarged fragmentary view of the valve in a closed position.
Figure 5:
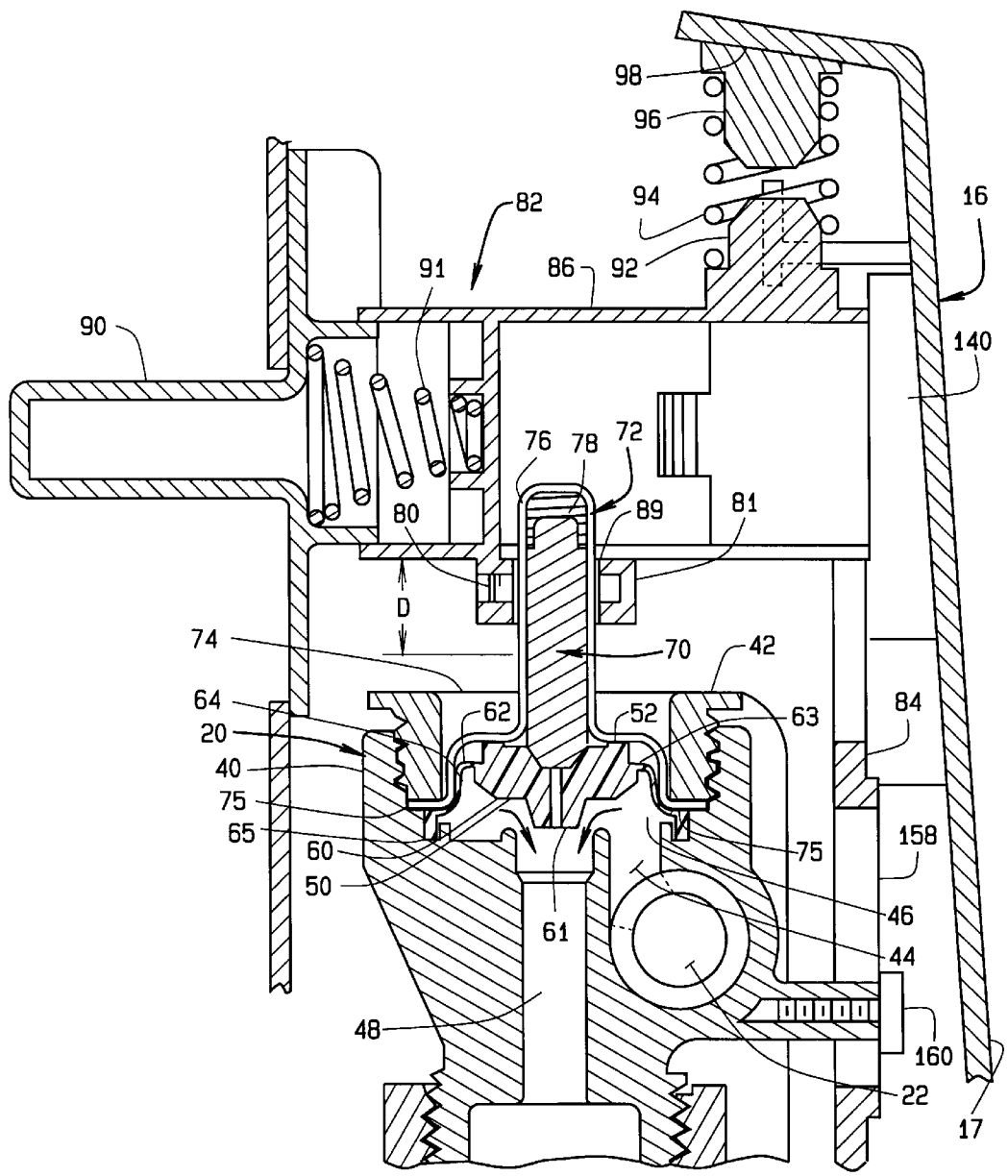
FIG. 5 is a similar view to FIG. 4 with the valve in an open position.

As best shown in FIGS. 4 and 5, the shut-off valve 20 includes a body 40 having a threadedly connected cap 42, an inlet 44 connected between the water supply line 22 and an inlet chamber 46. The shut-off valve 48 includes a valve seat 50 at its upper end and a valve element 52 which, in FIG. 4, is shown in a closed position. In the embodiment shown, the valve element 52 includes a body 60 having a passage 61 and an annular web 62 having bleed holes 64 and an outer ring 65 and constitutes a diaphragm. As shown in FIG. 3, the annular web outer ring 65 is clamped in place between the valve body 40, the casing 72 and the valve cap 42.

As shown in FIG. 4 and FIG. 5, respectively, the valve element 52 is movable from a closed position (FIG. 4) preventing flow through the valve seat 50 to an open position (FIG. 5) permitting flow through the valve seat 50. Upward movement is resisted by a plunger 70 provided on the other side of the valve element 52 and said plunger 70 is enclosed in a casing 72. The casing 72 includes a lower bell-shaped portion 74 having a flange 75, which is held in place between the valve body 40 and the threadedly connected cap 42 and an upper tubular portion 76 having a diameter sufficiently large that the plunger 70 can slide within said upper portion 76 against the resistance of a spring 78 provided at the end of the casing tubular portion 76.

In the valve closed position the valve element 52 is held against upward movement from water pressure in the inlet chamber 46 by water pressure in chamber 63, by the location of the plunger 70 relative to the magnet 80 and by the spring 78 which tends to hold the plunger 70 into the closed position. It will be appreciated that in the closed position, the area of the valve element upper surface in chamber 63 is greater than the area of the valve element lower surface in the inlet chamber 46 resulting in a net closing force due to water pressure on the valve element 52.

The plunger 70 is magnetically attractive and can be moved vertically away from the valve element 52 by upward movement of a permanent magnet 80 carried in a retainer 81 by the frame 82. The frame 82 includes a generally vertical member 84, which is movable relative to the base 16, an upper transverse member 86, with which the magnet retainer 81 is integrally formed, and a lower transverse member 88.

As shown in FIG. 3, the upper transverse member 86 is apertured at 89 to receive the plunger casing upper portion 76. At its outer end the upper transverse member 86 includes a handle 90 slidingly received within the transverse member 86. At its inner end the transverse member 86 includes a fixedly attached post member 92 carrying a return spring 94. The spring 94 is received by a member 96 having an abutment 98, and resists upward movement of the frame 82.

In the preferred embodiment the frame 82 includes a latching mechanism which permits the frame 82 to be held in the upper position so that the shut-off valve 20 can be maintained in open position without the need for the operator to hold the handle in place as will now be discussed with particular reference to FIGS. 6–9.

Figure 6:
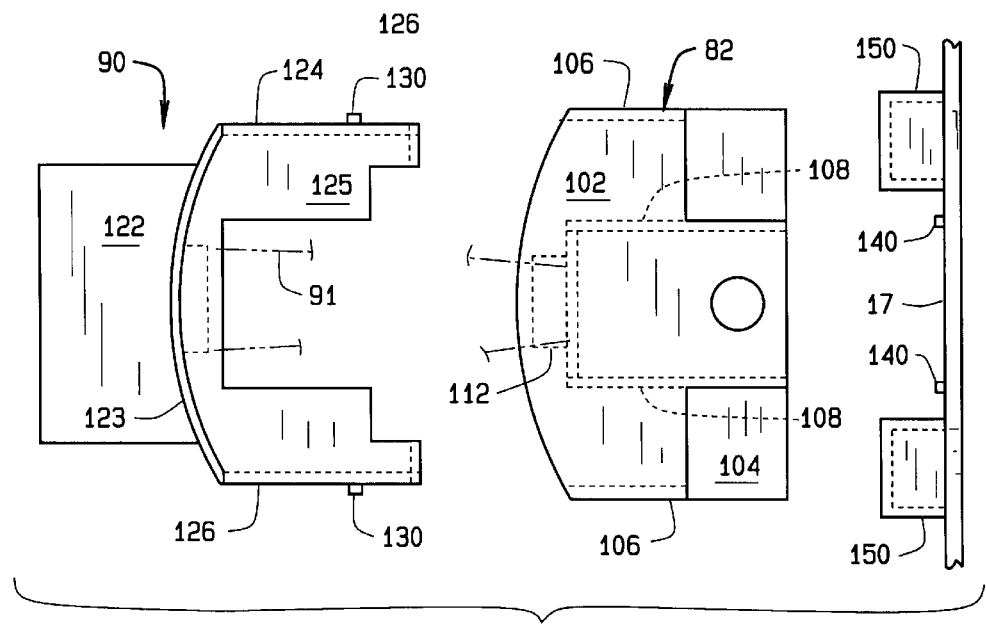
FIG. 6 is an exploded plan view showing the interconnection of the lift handle, the transverse frame member and the wall latch.
Figure 7:
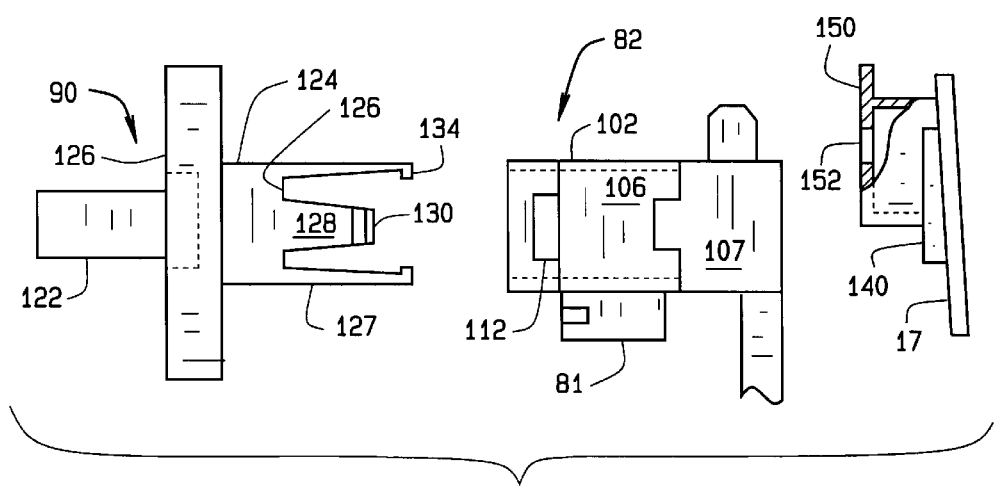
FIG. 7 is an elevational view thereof.

As shown in FIGS. 6 and 7, the upper transverse member 82 includes a box-like body having a generally tee-shaped upper wall 102, a lower wall 104, opposed outer walls 106 each having a notch 107 and inner side walls 108 having an end wall 110 carrying a spring retainer 112.

The handle 90 includes a lift portion 122 and a body portion 124, said portions being separated by a curved guard portion 123. The body portion 124 includes upper and lower walls 125 and 127 and opposed side walls 126 each having a central portion 128 with an outstanding snap member 130 connectingly engageable with the notched portions 107 of the transverse member 82, and upper and lower portions 132 and 133 respectively, members 132 having inwardly formed end hook portions 134 engageable with an associated hook-retainer wall member 150, when the handle 90 and frame 82 are in the raised position shown in FIG. 5. As clearly shown in FIG. 7, each hook retainer wall member 150 projects inwardly from the relatively inclined rear wall 17 and includes a front opening 152 in which an associated hook portion 134 can be inserted and held under spring pressure.

Figure 8:
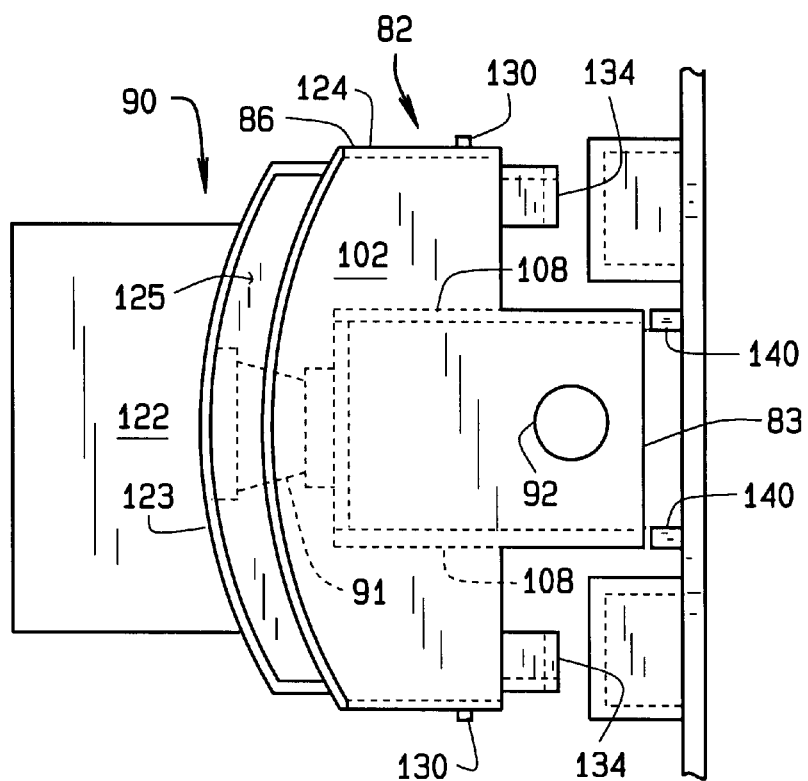
FIG. 8 is a plan view thereof in the operational position thereof.
Figure 9:
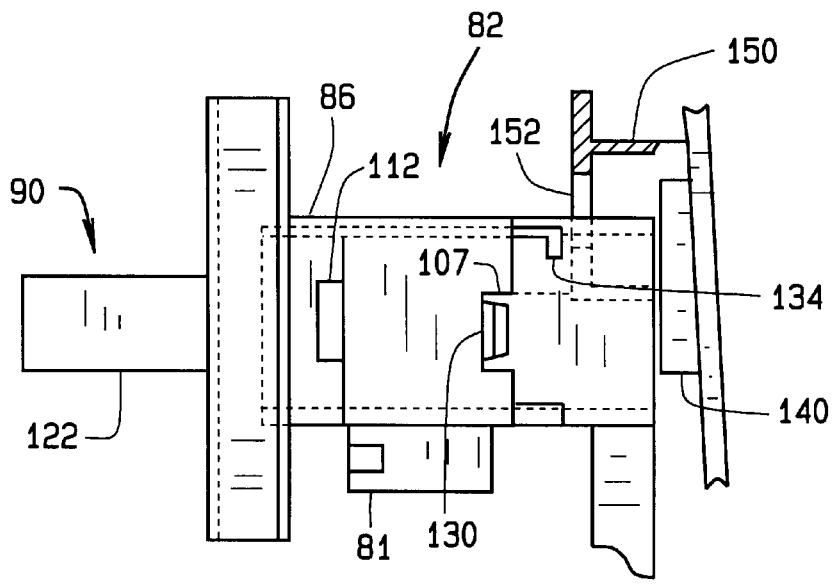
FIG. 9 is an elevational view thereof.

FIGS. 8 and 9 show the frame transverse member 86 and the handle 90 interconnected. This is achieved by inserting the handle body portion 124 into the slightly larger transverse member 86 until the handle snaps into place by virtue of the snaps 130 at the end of the flexible side members 128 engaging the side notches 107 of the transverse member 86. Because of the spring 91 between transverse member 86 and the handle 90, the transverse member 86 and the handle 90 are urged apart as can be seen in FIGS. 8 and 9.

As shown in FIG. 1 and FIG. 3, the frame 82 and the base 16 are connected together by a keyhole slot 154 and large beaded fastener 156 at the lower end, and a second keyhole slot 158 and large headed fastener 160 provided closer to the upper end of the frame. This arrangement provides that the frame 82 can move upwardly a distance which depends on the length of the keyhole slots. The inoperative position of the frame 82, when the valve 20 is closed is shown in FIGS. 3 and 4. When the frame 82 is moved upwardly carrying the magnet 80 with it, the plunger 70 also moves under magnetic attraction thereby opening the shut-off valve as previously described.

As shown in FIGS. 8 and 9, the end of the transverse body indicated by numeral 83, rides vertically on the rails 140. When the elevation is sufficiently high, the handle 90 may be pushed inwardly against the spring 91 so that the hook member 134 enters the opening 152 of the hook retainer box 150 which provides a latch. At this point the handle may be pushed downwardly slightly so that the hook engages the bottom lip of the opening 152. When the inward force applied against the spring 91 by the operator is released, the hook member is retained by outward movement of the handle 90, relative to the transverse member 82 induced by the spring 91. When it is desired to shut-off the valve 20 it is simply a matter of applying a slight inward pressure to the handle and raising it slightly and releasing the pressure so that the handle returns automatically to its position shown in FIG. 9 in which it is held by the snap connection and can be pushed downwardly lowering the magnet 80 and with it the plunger 70 to shut-off the valve 20.

The lower transverse member 88 is provided with an aperture 99 which is large enough to receive the outlet hose 33 but small enough to provide an abutment receiving the top of a container 100.

The arrangement described above provides that the frame 82 and the magnet 80 carried by the frame, can be lifted by grasping the handle 90 at the end of the upper transverse member 86 and lifting it from the position shown in FIG. 4 to the position shown in FIG. 5 a distance D. The frame 82 and magnet 80 can also be lifted by engaging the lower transverse member 88 by the top of the container 100. In both cases, the magnet 80, with its magnetic field, is raised causing the plunger 70 to move upwardly and away from the valve element 52 by the relocation of the magnetic field of the magnet 80. The upward movement of the plunger 70 opens passage 61 and allows water pressure in chamber 63 above the valve element to be relieved through valve outlet 48. With the plunger 70 raised and water pressure in the upper chamber 63 reduced, the valve element 52 also moves upwardly and away from the valve seat 50 under the pressure of water in the inlet chamber 46. As will readily be understood, upward movement of the valve element 52, away from the valve seat as shown in FIG. 5, permits water from the water supply to enter the outlet 48 by way of the supply line 22, the inlet 44 and the inlet chamber 46 and to be directed into the outlet 48 as shown by the arrows.

The dispensing apparatus 10 can be used to fill a large container, by using the handle 90 to lift to frame 82 and a long fill hose. It can also be used to fill a smaller container such as a bottle 100 by simply inserting a short hose into the neck of the bottle container 100 and using the neck end of the bottle to lift the frame 82. In both cases, the direction of movement of the actuator frame is vertical and in-line with valve element 52.

It will be understood that the arrangement described provides that the plunger 70, the magnet 80, the movable frame 82 and the handle 90 cooperate to provide an effective dual actuator means with the components moving in the same direction to open and close the shut-off valve 20.

Although the dispenser has been described by making detailed reference to a preferred embodiment, the details of the description are not be understood as restrictive numerous variants being possible within the scope of the claims hereunto appended.

We claim as our invention.

1. A dispensing apparatus comprising:
   a valve having an inlet receiving liquid from a liquid source and an outlet directing said liquid to a dispensing source, the valve including a valve seat disposed between the inlet and the outlet and defining a flow axis through the valve seat and a main operator movable from a closed position restricting flow through the valve seat to an open position permitting flow through the valve seat, the main operator including a valve element including a diaphragm and a plunger engageable with said diaphragm; and
   actuator means including a frame having a first portion and a second portion and carrying a magnetic element for moving the plunger from the closed position to the open position by magnetic attraction, the frame moving said plunger in the same direction as said frame when an upward force is applied by a container to one of said first and second frame portions.

2. A dispensing apparatus as defined in claim 1, wherein:
   the frame first portion carries said magnetic element, and the second portion is connected to said first portion for moving said first portion and said magnetic element.

3. A dispensing apparatus as defined in claim 2, wherein:
   said first portion includes a handle offset from the magnetic element.

4. A dispensing apparatus as defined in claim 2, wherein:
   said second portion includes a container engageable portion.

5. A dispensing apparatus as defined in claim 2, wherein:
   a handle is resiliently connected to the frame in sliding relation.

6. A dispensing apparatus as defined in claim 2, wherein:
   the frame includes means for holding the frame in a valve open condition.

7. A dispensing apparatus as defined in claim 3, wherein:
   the handle includes a means for holding the frame in a valve open position.

8. A dispenser as defined in claim 7, wherein:
   the holding means includes a hook means for releasably holding the handle.

9. A dispensing apparatus comprising:
   a valve having an inlet receiving liquid from a liquid source and an outlet directing said liquid to a dispensing source, the valve including a valve seat disposed between the inlet and the outlet and defining a flow axis through the valve seat and a main operator movable from a closed position restricting flow through the valve seat to an open position permitting flow through the valve seat, the main operator including a valve element including a diaphragm and a plunger engageable with said diaphragm;
   actuator means including a frame having an upper portion and a lower portion and carrying a magnetic element disposed about the plunger for moving the plunger from the closed position to the open position by magnetic attraction, the frame moving said plunger in the same direction as said frame when an upward force is applied to one of said upper and lower frame portions; and
   the frame upper portion carrying the magnetic element and including a handle portion offset from the magnetic element and providing one means of manually raising the magnet and opening the valve, and the frame lower portion being connected to the upper portion and providing another means of raising the magnet and opening the valve by the upward application of a container to the lower portion.

* * * * *